Oct. 2, 1928.
H. C. FRAYER
1,685,876
TOOTHBRUSH CONTAINER
Filed Feb. 9, 1925
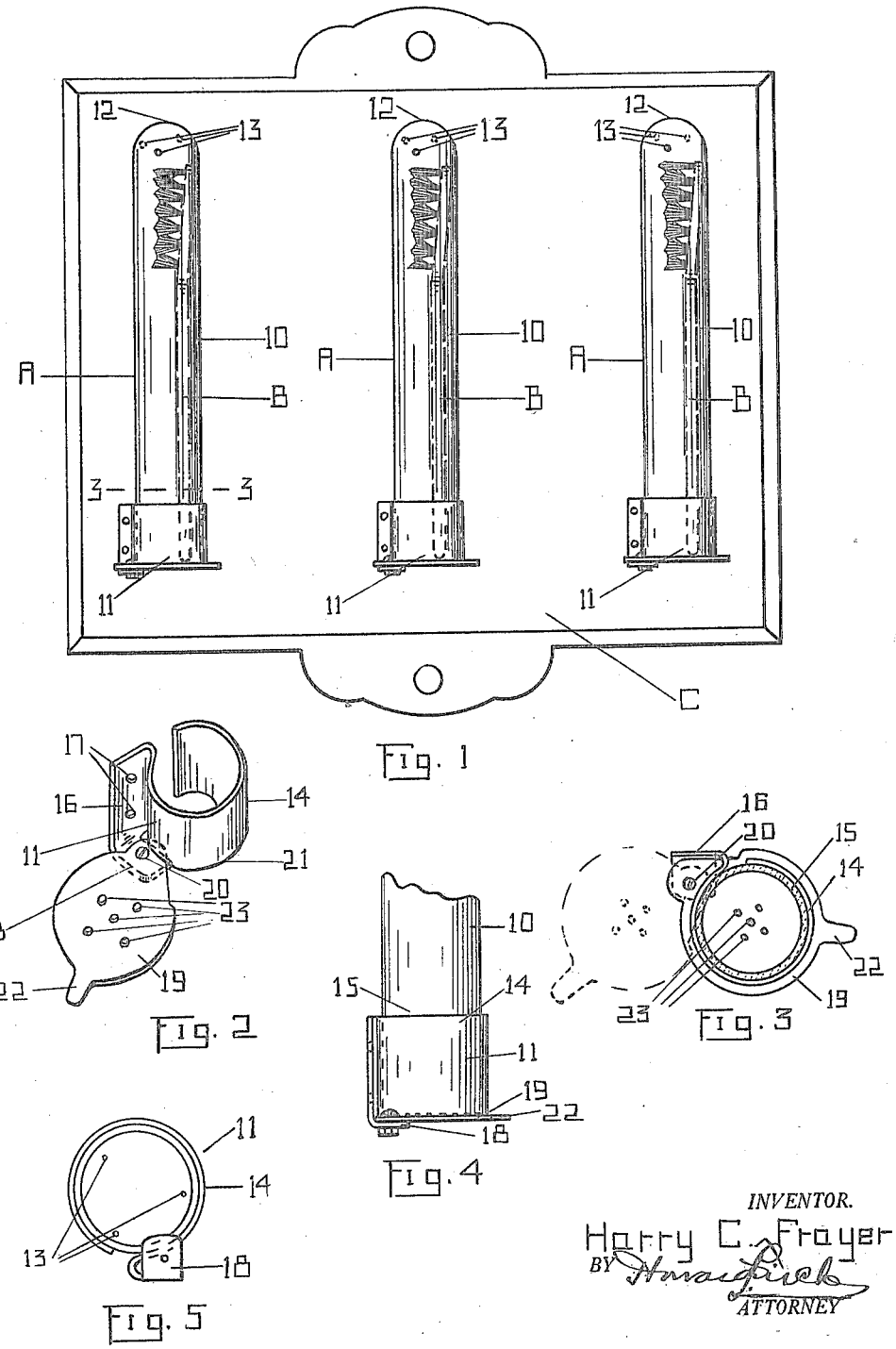
INVENTOR.
Harry C. Frayer
BY
ATTORNEY Patented Oct. 2, 1928.

1,685,876

UNITED STATES PATENT OFFICE.

HARRY C. FRAYER, OF ST. PAUL, MINNESOTA, ASSIGNOR TO STERILIZABLE TOOTH BRUSH CONTAINER COMPANY, OF ST. PAUL, MINNESOTA, A CORPORATION OF MINNESOTA.

TOOTHBRUSH CONTAINER.

Application filed February 9, 1925. Serial No. 7,879.

My invention relates to tooth brush containers and is designed to provide a holder for the tooth brush so that it is clearly visible and yet freely accessible for use when desired.

A feature of the invention resides in the easy and freely removable glass cover for the tooth brush which is designed to entirely cover the tooth brush and hold the same clean and sanitary. The easy removable feature of the glass cover for the tooth brush is particularly designed so that the glass can be sterilized by boiling or other suitable means. This construction permits the glass cover to be easily replaceable, if it should be broken by accident. The glass cover is designed with openings so that a draft of air can pass over the tooth brush to permit the same to be readily dried even though it is covered by the glass.

Another feature of my invention resides in providing a spring holding means for the glass which frictionally engages the glass and holds it in place. This holder permits the glass to be freely removed therefrom when desired and also forms a bottom for the tooth brush container which is provided with openings so as to permit air to pass freely through the tooth brush container with practically a straight draft of air over the brush, thus readily drying the same after it has been used. The holder is provided with a lip which forms a stop for the bottom of the glass cover so as to hold the same in place in the spring holder.

It is a feature of the invention to provide a holding means for the glass so that the same is held under spring tension and resiliently supported so that the top of the glass is free and unsupported in a manner so that it can move slightly or enough so that an ordinary bump or striking against the same will not break the glass as is true where the glass is held in a rigid clamp at the top and the bottom. This is an important feature of the invention, as the glass is held unsupported at the top, free to move sufficiently to protect the same. The providing of a holder for the bottom of the glass with the upper end free permits light to be directed to the tooth brush in a very effective manner and as it is evident that light acts largely as a sterilizing medium and is a very good purifying means, it is therefore apparent that my holder is of a very desirable construction as it permits light to be directed to the tooth brush and the bristles of the same, yet covers the brush to protect it and thus provides a tooth brush container of a very desirable nature.

In carrying out my invention the glass holders may be mounted upon a back so that several holders can be set up together for the family tooth brushes and yet the brushes are held entirely separate from each other so that they cannot contact and become infected by the bristles one from the other.

Other objects and features of the invention will be more fully set forth in the following specification and claim:

In the drawings forming part of my specification,

Figure 1 is a front view of my holder showing a panel having several individual tooth brush covers thereon.

Figure 2 illustrates a perspective view of the spring holder for the glass cover.

Figure 3 is a section on the line 3—3 of Figure 1.

Figure 4 is a side view of the holder slightly enlarged to more clearly illustrate the same.

Figure 5 is an enlarged bottom view of the spring holder for the glass with the bottom closure removed therefrom.

In the drawings my tooth brush holder A is made up of a glass cover 10 which is frictionally supported in the spring holder member 11 at the bottom thereof.

The glass cover 10 is formed with a round top 12 which is provided with holes 13 inside of the same. The cover 10 fits frictionally into the spring holder 11. This holder is formed of a piece of spring metal or other suitable material having the circular body portion 14 into which the smooth cylindrical end 15 of the cover 10 frictionally fits.

This smooth end 15 of the glass cover 10 permits the cover to be slipped into the spring body portion 14 of the clamp member 11 which holds the cover supported at its lower end with the upper end 12 free and unsupported on all sides so as to be freely movable or resilient so that it will be protected against any jar or bump that it may receive in use. This makes the device much more practical in actual use and provides a very simple and effective construction.

The spring clamp members 11, having the cylindrical spring or circular body portion 14, are provided with a side flange or lip 16 which has openings 17 for screws or rivets so that it can be fastened to the wall or on to a base plate, for supporting the same, such as C. This base plate C is of any ordinary construction, either metal or wood, as may be desired, and is adapted to be fastened on to the wall in any suitable manner.

Formed integrally with and projecting transversely is a lip 18 projecting horizontally from the flange 16 and at the bottom of the holder 11. This lip 18 is adapted to pivotally support the bottom 19 of the holder 11. The bottom 19 is pivoted at 20 to the lip 18 and thus the bottom 19 is held between the lip 18 and the lower edge 21 of the holder 11. This supports the bottom 19 so that it will swing in close relation to the bottom edge 21 of the holder 11 to close the tooth brush container after the tooth brush has been placed in the same and to project up into the glass cover 10 as illustrated in Figure 1.

The bottom 19 is formed with an engaging lip 22, which projects from the circumference of the bottom and thus this permits the easy engagement of the bottom to turn it out into open position or move it back into closed position. These positions are clearly illustrated in the drawings in Figure 3. The bottom 19 is formed with openings 23 in the same, which permit air to pass into and through the glass cover 10 by passing out through the openings 13 in the top of the cover 10. This permits air to freely circulate with a direct draft through the cover 10 and thus allows brush B, as illustrated in Figure 1, to freely dry. It is quite important that this air passage be direct and free through the container. The openings 23 in the bottom 19 also permit the moisture or water remaining on the brush handle to drain out through the same.

In the drawings, Figure 1 illustrates three of my tooth brush containers attached to the back C and each of which is illustrated with a brush B positioned therein. Obviously, these containers can be placed closer or farther apart as may be desired. My containers used in this manner keep the tooth brushes B absolutely separated from each other and permit the light and air to have free access to the same about the entire tooth brush much better than by ordinary holders. Holders of this kind for tooth brushes keep the brushes separated from each other so that no disease can be carried from one brush to the other and the light can be projected freely to all sides of the brush.

The body portions 14 which form a spring engaging band for the glass covers 10 is of a very simple construction, inexpensive to manufacture and very effective in holding the glass covers 10.

A tooth brush container and holder, as illustrated in my invention is very practical for use in holding the brush individually separate from other brushes which are adapted to be held on the same panel and this holding means is readily adapted to display purposes for tooth brushes in stores and other places where tooth brushes are offered for sale. A display for tooth brushes of this kind allows the brush to be clearly inspected through the glass and if it is desired it can be removed by turning the bottom 19 to one side and allowing the brush to drop out of the open end of the cover 10.

The projecting lip 18 forms a stop against which the lower edge of the cover 10 engages so as to hold the cover 10 in the proper position in the holder 11. When the bottom 19 is in place on the lip 18 the lower edge of the cover 10 strikes against the same. Thus the lip 18 and the edge of the cover 19, which is pivoted at 20, form a stop to hold the cover 10 in place.

In accordance with the patent statutes I have described my invention, illustrating the best embodiment thereof, but I desire to have it understood that the invention can be carried out by other means and applied to uses other than those above set forth within the scope of the following claim.

I claim:

A tooth brush holder comprising a glass tube cover member having perforations near the top thereof, hook-shaped means for frictionally holding the lower end of said cover member, a flange integral with said holding means upon one end thereof, a lip horizontally disposed upon said flange and extending inside the opening in the lower portion of said cover member, and a pivoted bottom portion secured to said lip.

HARRY C. FRAYER.